United States Patent
Marupaduga et al.

(10) Patent No.: US 11,729,698 B1
(45) Date of Patent: Aug. 15, 2023

(54) WIRELESS COMMUNICATION NETWORK ACCESS CONTROL BASED ON WIRELESS NETWORK SLICE USAGE

(71) Applicant: T-Mobile Innovations LLC, Overland Park, KS (US)

(72) Inventors: Sreekar Marupaduga, Overland Park, KS (US); Roopesh Kumar Polaganga, Bothell, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 176 days.

(21) Appl. No.: 17/393,537

(22) Filed: Aug. 4, 2021

(51) Int. Cl.
*H04W 48/06* (2009.01)
*H04W 36/38* (2009.01)
*H04W 36/16* (2009.01)
*H04W 36/08* (2009.01)

(52) U.S. Cl.
CPC .......... *H04W 48/06* (2013.01); *H04W 36/08* (2013.01); *H04W 36/165* (2013.01); *H04W 36/38* (2013.01)

(58) Field of Classification Search
CPC ..... H04W 28/08; H04W 88/06; H04W 36/08; H04W 36/165; H04W 36/38
See application file for complete search history.

(56) References Cited

U.S. PATENT DOCUMENTS

| | | |
|---|---|---|
| 10,264,445 B2 | 4/2019 | Lu |
| 10,412,741 B2 | 9/2019 | Lee et al. |
| 10,659,993 B2 | 5/2020 | Ryoo et al. |
| 10,791,508 B2 | 9/2020 | Park et al. |
| 10,945,103 B2 | 3/2021 | Shaw et al. |
| 2017/0332421 A1 | 11/2017 | Sternberg et al. |
| 2017/0367036 A1 | 12/2017 | Chen et al. |
| 2018/0310238 A1 | 10/2018 | Opsenica et al. |
| 2019/0020996 A1 | 1/2019 | Zhang et al. |
| 2019/0246334 A1* | 8/2019 | Wang ............... H04W 48/16 |
| 2021/0144790 A1* | 5/2021 | Faccin ............... H04W 60/00 |
| 2023/0022184 A1* | 1/2023 | Sajjan ............... H04W 48/02 |

* cited by examiner

*Primary Examiner* — Pao Sinkantarakorn
*Assistant Examiner* — Kabir U Jahangir

(57) ABSTRACT

A wireless access node serves slice-capable User Equipment (UEs) and slice-incapable UEs. In the wireless access node, a radio exchanges slice data between the slice-capable UEs and a Baseband Unit (BBU). The radio exchanges non-slice data between the slice-incapable UEs and the BBU. The BBU exchanges the slice data with a wireless network slice and exchanges the non-slice data with a network element. The BBU determines its load for the slice-capable UEs. The BBU controls access to the wireless access node by new slice-incapable UEs based on the load for the slice-capable UEs.

20 Claims, 10 Drawing Sheets

US 11,729,698 B1

WIRELESS COMMUNICATION NETWORK ACCESS CONTROL BASED ON WIRELESS NETWORK SLICE USAGE

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless user devices execute user applications that use the wireless data services. For example, a smartphone may execute a social-networking application that communicates with a content server over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into network data centers. The network elements comprise Access and Mobility Management Functions (AMFs), Session Management Functions (SMFs), User Plane Functions (UPFs), Application Server Function (ASFs), and the like.

Some network elements like UPFs are used to form wireless network slices that deliver specific data services like low-latency augmented-reality or high-bandwidth media-streaming. A wireless user device hosts user applications that consume the data services and are served by the wireless network slices that correspond to the user applications. For example, a wireless user device may execute an augmented-reality application and responsively request a low-latency wireless network slice that features a local augmented-reality server. Another wireless user device may execute a movie application and responsively request a high-bandwidth wireless network slice that features a content-delivery server.

The wireless access nodes also serve wireless user devices that do not use the wireless network slices. Unfortunately, the wireless access nodes reduce their service quality for the wireless user devices that use the wireless network slices to serve the wireless user devices that do not use the wireless network slices. Moreover, the service quality for the wireless user devices that do not use the wireless network slices may also degrade.

TECHNICAL OVERVIEW

A wireless access node serves slice-capable User Equipment (UEs) and slice-incapable UEs. In the wireless access node, a radio exchanges slice data between the slice-capable UEs and a Baseband Unit (BBU). The radio exchanges non-slice data between the slice-incapable UEs and the BBU. The BBU exchanges the slice data with a wireless network slice and exchanges the non-slice data with a network element. The BBU determines its load for the slice-capable UEs. The BBU controls access to the wireless access node for new slice-incapable UEs based on the load for the slice-capable UEs.

DETAILED DESCRIPTION

Figure 1:
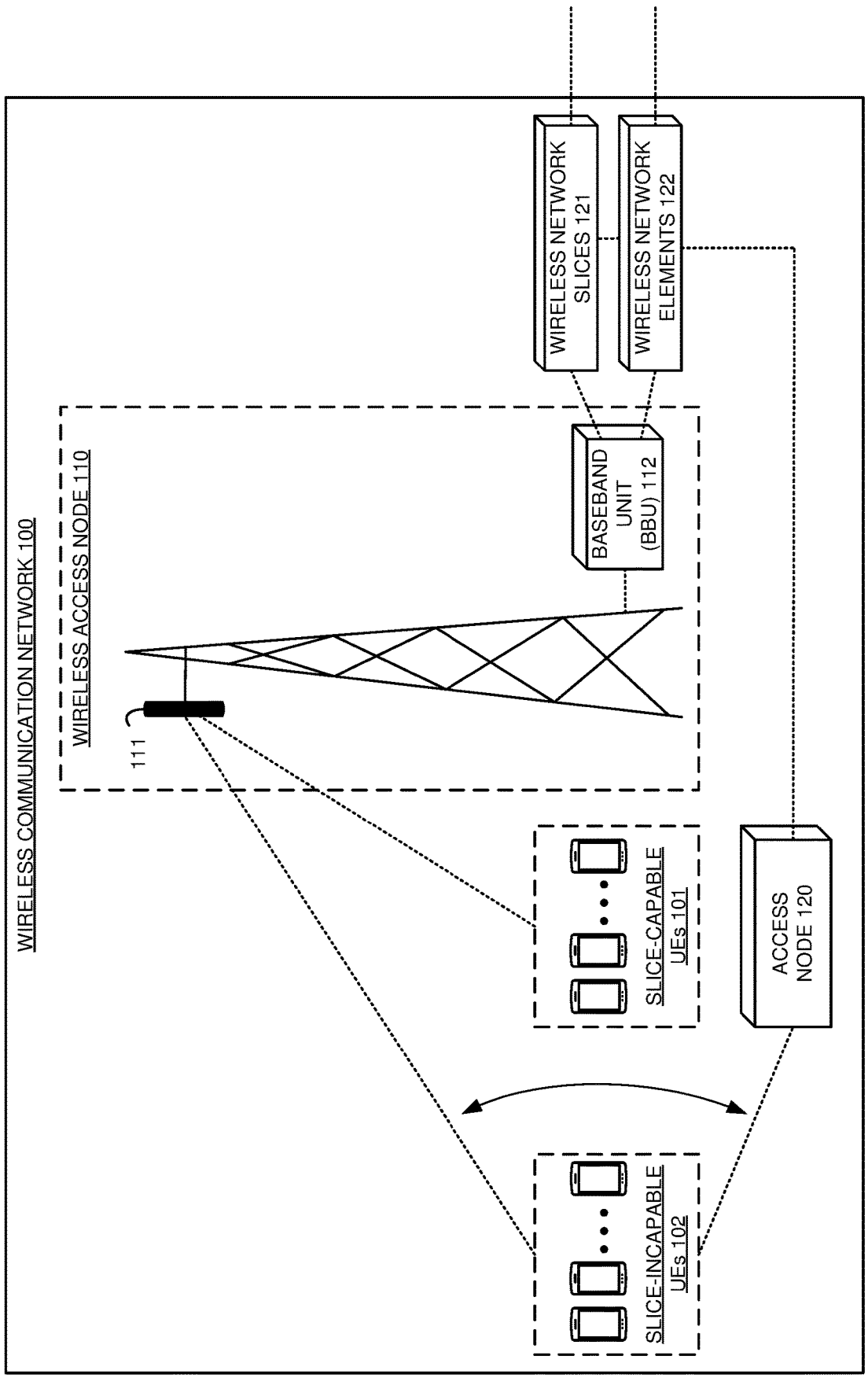
FIG. 1 illustrates a wireless communication network to control User Equipment (UE) access based on wireless network slice usage.

FIG. 1 illustrates wireless communication network 100 to control User Equipment (UE) access based on wireless network slice usage. Wireless communication network 100 delivers wireless data services to UEs 101-102 like machine-control, internet-access, media-streaming, social-networking, or some other networking product. UEs 101-102 comprise computers, phones, vehicles, sensors, robots, or some other data appliances with communication circuitry. Wireless communication network 100 comprises slice-capable UEs 101, slice-incapable UEs 102, wireless access node 110, wireless network slices 121, and wireless network elements 122. Wireless access node 110 comprises radio 111 and Baseband Unit (BBU) 112.

Slice-capable UEs 101 report their slice capabilities to network elements 122 and exchange slice data with wireless network slices 121 over wireless access node 110. Slice-incapable UEs 102 do not report these slice capabilities to network elements 122 and do not exchange the slice data with wireless network slices 121. Slice-incapable UEs 102 exchange non-slice data with wireless network elements 122 over wireless access nodes 110 and 120. Wireless communication network 100 is simplified and typically includes more access nodes than the amount shown.

Various examples of network operation and configuration are described herein. In some examples, slice-capable UEs 101 and radio 111 wirelessly exchange slice data. Radio 111 and BBU 112 exchange the slice data. Slice-incapable UEs 102 and radio 111 wirelessly exchange non-slice data. Radio 111 and BBU 112 exchange the non-slice data. BBU 112 and wireless network slices 121 exchange the slice data. BBU 112 and network elements 122 exchange the non-slice data. BBU 112 determines the load of slice-capable UEs 101 on wireless access node 110, and in response, BBU 112 controls access to wireless access node 110 by slice-incapable UEs 102 based on the load. For example, BBU 112 may reject access for new slice-incapable UEs 102 that attempt to attach when the load has increased. BBU 112 may redirect currently-served slice-incapable UEs 102 to access node 120 when the load has increased. When the load has decreased, BBU 112 may again accept access for new slice-incapable UEs 102 that attempt to attach. BBU 112 may redirect some slice-incapable UEs 102 from access node 120 back to wireless access node 110 when the load has decreased. Advantageously, wireless access node 110 does not reduce service quality for slice-capable UEs 101 to serve slice-incapable UEs 102. Moreover, the service quality for slice-incapable UEs 102 may be improved by rejecting attachments and redirecting slice-incapable UEs 102 to access node 120.

Access nodes 110 and 120 comprise Fifth Generation New Radio (5GNR) access nodes, non-Third Generation Partnership Project (non-3GPP) access nodes, Long Term Evolution (LTE) access nodes, Institute of Electrical and Electronic Engineers (IEEE) 802.11 (WIFI) access nodes, IEEE 802.3 (ETHERNET) access nodes, Internet Protocol (IP) access nodes, Low-Power Wide Area Network (LP-WAN) access nodes, Personal Area Network (PAN) access nodes, or some other type of access nodes. Wireless network slices 121 comprise network elements like User-Plane Function (UPF) and Application Server Function (ASF). Wireless network elements 122 comprise control-plane and user-plane elements like Access and Mobility Management Entities (AMFs), Interworking Functions (IWFs), Session Management Functions (SMFs), UPFs, ASFs, and the like. The various communication links in wireless communication network 100 are represented by dotted lines on FIG. 1 and use metallic wiring, glass fibers, radio channels, or some other communication media. These communication links use IP, ETHERNET, WIFI, 5GNR, LTE, Data Over Cable System Interface Specification (DOCSIS), General Packet Radio Service Transfer Protocol (GTP), Time Division Multiplex (TDM), virtual switching, inter-processor communication, bus interfaces, and/or some other data communication protocols. UEs 101-102, nodes 110 and 120, slices 121, and elements 122 comprise microprocessors, software, memories, transceivers, bus circuitry, and the like. UEs 101-102, nodes 110, and node 120 also comprise radios. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein.

Figure 2:
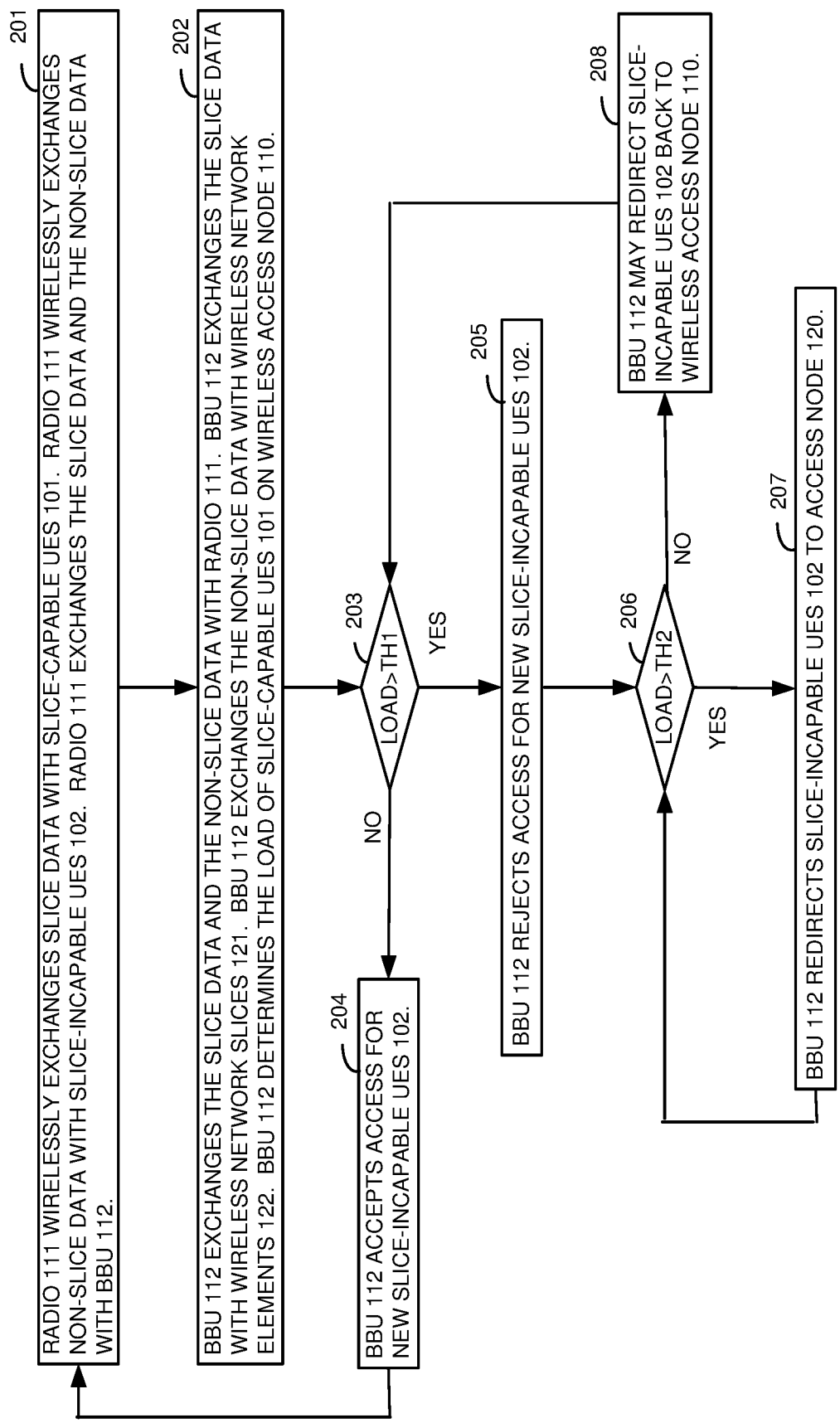
FIG. 2 illustrates an exemplary operation of the wireless communication network to control the UE access based on the wireless network slice usage.

FIG. 2 illustrates an exemplary operation of wireless communication network 100 to control UE access based on the wireless network slice usage. The operation may vary in other examples. Radio 111 wirelessly exchanges slice data with slice-capable UEs 101 (201). Radio 111 wirelessly exchanges non-slice data with slice-incapable UEs 102 (201). Radio 111 exchanges the slice data and the non-slice data with BBU 112 (201). BBU 112 exchanges the slice data and the non-slice data with radio 111 (202). BBU 112 exchanges the slice data with wireless network slices 121 (202). BBU 112 exchanges the non-slice data with wireless network elements 122 (202). BBU 112 determines the load of slice-capable UEs 101 on wireless access node 110 (202). When the load of slice-capable UEs 101 on wireless access node 110 is below a first threshold "TH1" (203), BBU 112 accepts access for new slice-incapable UEs 102 (204) and the operation returns to (201). When the load of slice-capable UEs 101 on wireless access node 110 exceeds TH1 (203), BBU 112 rejects access for new slice-incapable UEs 102 (205). When the load of slice-capable UEs 101 on wireless access node 110 exceeds a second threshold "TH2" (206), BBU 112 redirects currently-served slice-incapable UEs 102 to access node 120 (207) and the operation returns to (206). When the load of slice-capable UEs 101 on wireless access node 110 is below TH2 (206), BBU 112 may redirect slice-incapable UEs 102 from wireless access node 120 back to wireless access node 110 (208) and the operation returns to (203).

Figure 3:
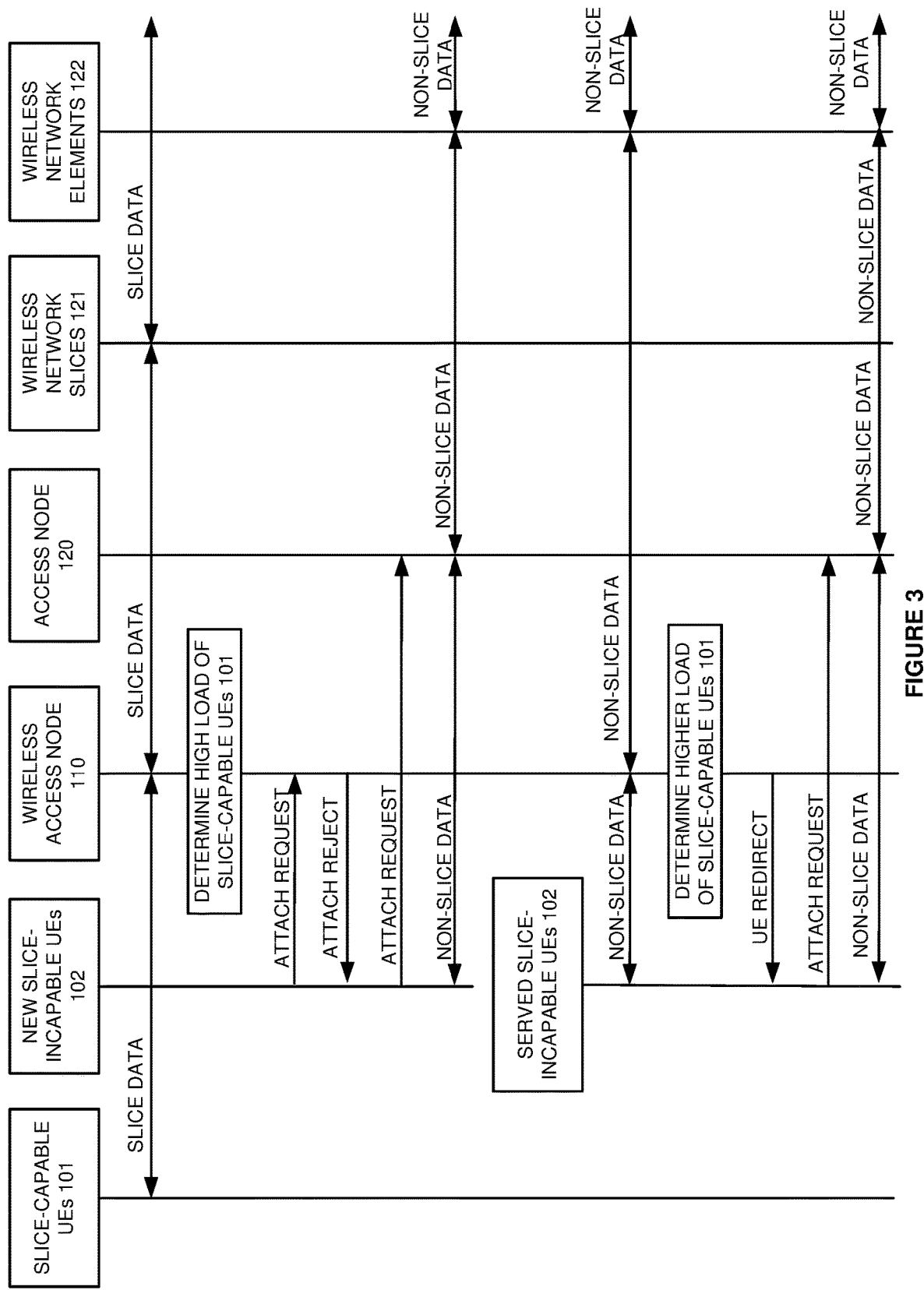
FIG. 3 illustrates an exemplary operation of the wireless communication network to control the UE access based on the wireless network slice usage.

FIG. 3 illustrates an exemplary operation of wireless communication network 100 to control the UE access based on the wireless network slice usage. The operation may vary in other examples. Slice-capable UEs 101 and wireless access node 110 wirelessly exchange slice data. Wireless access node 110 and wireless network slices 121 exchanges the slice data. Wireless network slices 121 exchange the slice data with external systems. Wireless access node 110 determines that the load of slice-capable UEs 101 on wireless access node 110 has become high, and in response, wireless access node 110 starts to reject attachment requests from new slice-incapable UEs 102. New slice-incapable UEs 102 then attach to access node 120. New slice-incapable UEs 102 and wireless access node 120 exchange non-slice data. Access node 120 and wireless elements 122 exchange the non-slice data. Wireless network elements 122 exchange the non-slice data with external systems. Currently-served slice-incapable UEs 102 and wireless access node 110 wirelessly exchange non-slice data. Wireless access node 110 and wireless network elements 121 exchange the non-slice data. Wireless network elements 121 exchange the non-slice data with external systems. Wireless access node 110 determines that the load of slice-capable UEs 101 on wireless access node 110 is even higher, and in response, wireless access node 110 starts to redirect currently-served slice-incapable UEs 102 to access node 120. These formerly-served slice-incapable UEs 102 then attach to access node 120. Formerly-served slice-incapable UEs 102 and wireless access node 120 exchange non-slice data. Access node 120 and wireless elements 122 exchange the non-slice data. Wireless network elements 122 exchange the non-slice data with external systems. As the slice-capable UE load decreases, wireless access node 110 may stop the redirection of currently-served slice-incapable UEs 102 away from wireless access node 110—and may redirect slice-incapable UEs 102 back to node 120. As the slice-capable UE load decreases even more, wireless access node 110 may stop the rejection of access attempts by new slice-incapable UEs 102 and start to accept attachments of new slice-incapable UEs 102.

Figure 4:
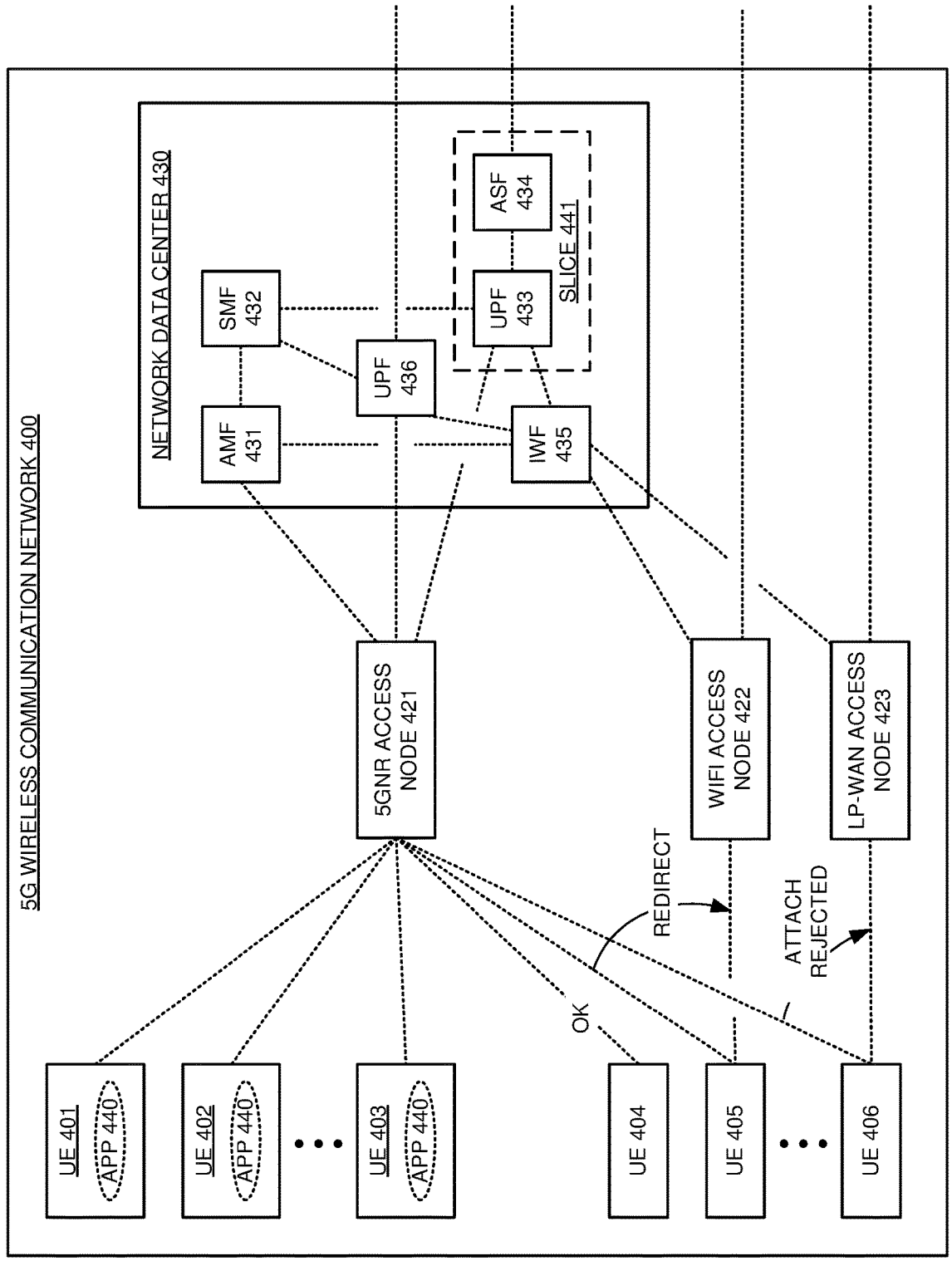
FIG. 4 illustrates a Fifth Generation (5G) wireless communication network to control UE access based on wireless network slice usage.

FIG. 4 illustrates Fifth Generation (5G) wireless communication network 400 to control UE access based on wireless network slice usage. 5G wireless communication network 400 comprises an example of wireless communication network 100, although network 100 may differ. 5G wireless communication network 400 comprises slice-capable UEs 401-403, slice-incapable UEs 404-406, access nodes 421-423, and network data center 430. Network data center 430 comprises Access and Mobility Management Function (AMF) 431, Session Management Function (SMF) 432, User-Plane Function (UPF) 433, Application Server Function (ASF) 434, Non-3GPP Interworking Function (IWF) 435, and UPF 436. Additional network elements like Policy Control Function (PCF) and Network Slice Selection Function (NSSF) are typically present but are omitted for clarity. Wireless network slice 441 comprises UPF 433 and ASF 434. Slice-capable UEs have user application 440 that interacts with wireless network slice 441. For example, application 440 and slice 441 may deliver an augmented-reality service to the users of UEs 401-403. The number of UEs, access nodes, network functions, and slices is typically greater and has been restricted for clarity on FIG. 4.

Slice-capable UEs 401-403 attach to 5GNR access node 421. Slice-capable UEs 401-403 are authenticated by AMF 431 and report their capability for slice 441. AMF 431 authorizes slice 441 for UEs 401. AMF 431 directs SMF 432 to serve UEs 401-403 over slice 441 and 5GNR access node 421. AMF 431 directs 5GNR access node 421 to connect UEs 401-403 to UPF 433 in slice 441. SMF 432 directs UPF 433 to serve UEs 401-403 over wireless access node 421. User application 440 in UEs 401-403 and ASF 434 exchange slice data over 5GNR access node 421 and UPF 433. ASF 434 exchanges some slice data with external systems.

Slice-incapable UEs 404-405 attach to 5GNR access node 421. Slice-incapable UEs 404-405 are authenticated by AMF 431 but do not report the capability for slice 441. AMF 431 authorizes a service for UEs 404-405 but does not authorize slice 441 for UEs 404-405. AMF 431 directs SMF 432 to serve UEs 404-405 over 5GNR access node 421. AMF 431 directs 5GNR access node 421 to connect UEs 404-405 to UPF 436. SMF 432 directs UPF 436 to serve UEs 404-405 over 5GNR access node 421. UE 404-405 and external systems exchange non-slice data over 5GNR access node 421 and UPF 436.

5GNR access node 421 determines that its load of slice-capable UEs has reached a high threshold and responsively starts to reject new attachment requests from slice-incapable UEs like UEs 404-406. When slice-incapable UE 406 attempts to attach to 5GNR access node 421 and the load is high, 5GNR access node 421 rejects the attachment because UE 406 did not report a capability for slice 441. In response to the rejection, slice-incapable UE 406 attaches to LP-WAN access node 423 and registers with AMF 431 over IWF 435. UE 406 is authenticated by AMF 431 but does not report capability for slice 441. AMF 431 authorizes a service for UE 406 but does not authorize slice 441 for UE 406. AMF 431 directs SMF 432 to serve UE 406. AMF 431 directs IWF 436 to connect UE 406 to UPF 436. SMF 432 directs UPF 436 to serve UE 406 over IWF 435. UE 406 and external systems exchange non-slice data over LP-WAN access node 423, IWF 435, and UPF 436.

5GNR access node 421 determines that its load of slice-capable UEs has reached a higher threshold and responsively starts to redirect currently-served slice-incapable UEs like UEs 404-405 to other access nodes. 5GNR access node 421 redirects slice-incapable UE 405 to WIFI access node 422 and allows UE 404 to remain on node 421 for now. Slice-incapable UE 405 attaches to WIFI access node 422 and registers with AMF 431 over IWF 435. UE 405 is authenticated by AMF 431 but does not report capability for slice 441. AMF 431 authorizes a service for UE 405 but does not authorize slice 441 for UE 405. AMF 431 directs SMF 432 to serve UE 405. AMF 431 directs IWF 435 to connect UE 405 to UPF 436. SMF 432 directs UPF 436 to serve UE 405 over IWF 435. UE 405 and external systems exchange non-slice data over WIFI access node 422, IWF 435, and UPF 436.

5GNR access node 421 determines that its load of slice-capable UEs has fallen below the higher threshold and stops redirecting slice-incapable UEs—5GNR access node 421 does not redirect UE 404. 5GNR access node 421 may redirect slice-incapable UEs like UE 405 back to node 421. 5GNR access node 421 determines that its load of slice-capable UEs has fallen below the high threshold and starts accepting attachment of new slice-incapable UEs like UE 406.

Figure 5:
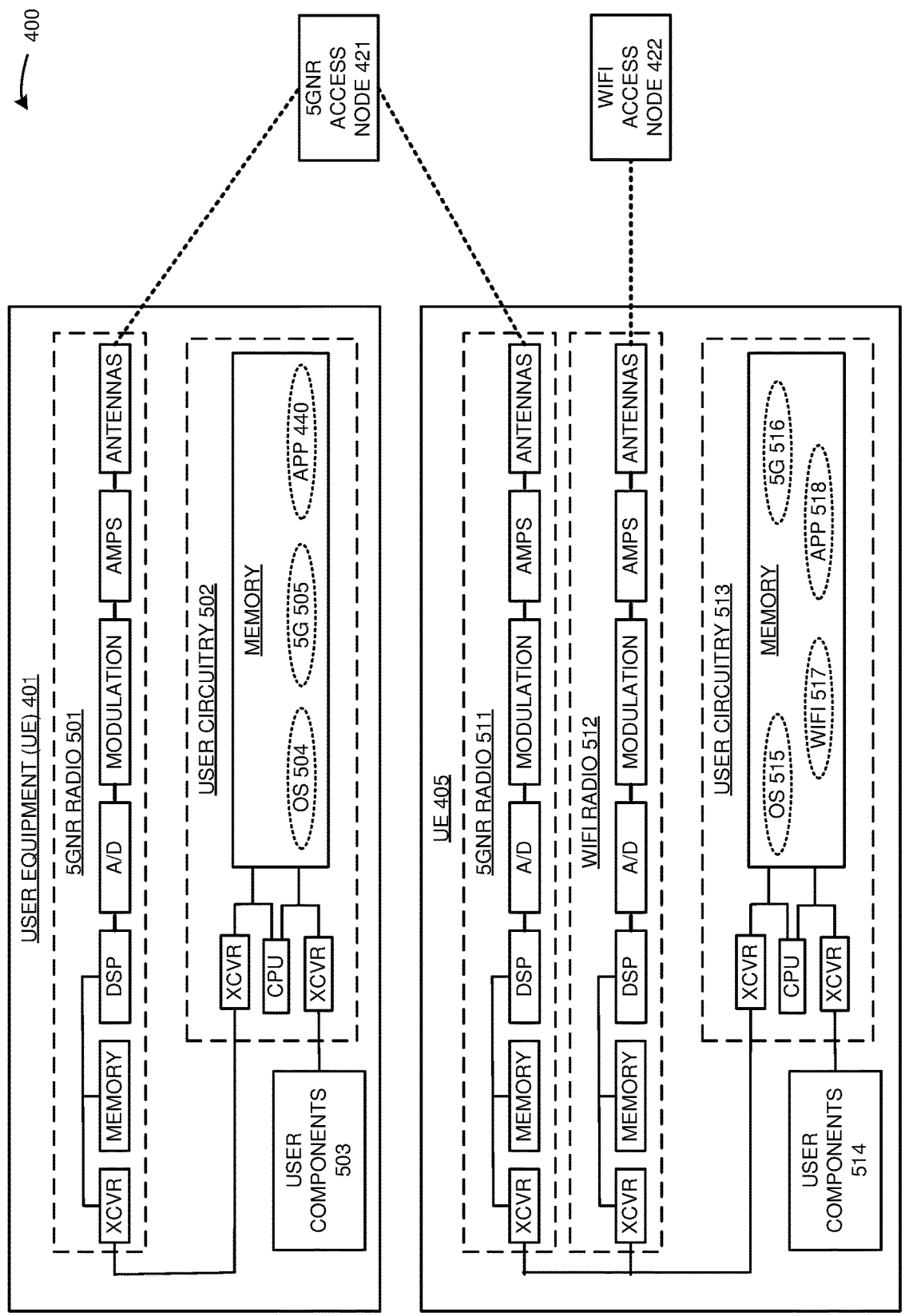
FIG. 5 illustrates UEs in the 5G wireless communication network.

FIG. 5 illustrates UE 401 and UE 405 in 5G wireless communication network 400. UE 401 comprises an example of slice-capable UEs 101 and 402-403, although UEs 101 and 402-403 may differ. UE 405 comprises an example of slice-incapable UEs 102, 404, and 406, although UEs 102, 404, and 406 may differ. UE 401 comprises 5G New Radio (5GNR) radio 501, user circuitry 502, and user components 503. User components 503 comprise sensors, controllers, displays, or some other user apparatus that consumes wireless data service. 5GNR radio 501 comprises antennas, amplifiers, filters, modulation, analog-to-digital interfaces, DSP, memory, radio applications, and transceivers that are coupled over bus circuitry. User circuitry 503 comprises memory, CPU, user interfaces and components, and transceivers that are coupled over bus circuitry. The memory in user circuitry 502 stores operating system (OS) 504, 5G applications 505, and user application (APP) 440. 5G applications 505 and user application 440 are slice-capable. 5G applications 505 comprises components like Physical Layer (PHY), Media Access Control (MAC), Radio Link Control (RLC), Packet Data Convergence Protocol (PDCP), Service Data Adaption Protocol (SDAP), and Radio Resource Control (RRC). The antennas in 5GNR radio 501 are wirelessly coupled to 5GNR access node 421 over 5GNR links. Transceivers (XCVRs) in 5GNR radio 501 are coupled to transceivers in user circuitry 502. Transceivers in user circuitry 502 are coupled to user components 503. The CPU in user circuitry 502 executes OS 504, 5G applications 505, and user application 440 to exchange network signaling and slice data for slice 441 with 5GNR access node 421.

UE 405 comprises 5GNR radio 511, WIFI radio 512, user circuitry 513, and user components 514. User components 514 comprise sensors, controllers, displays, or some other user apparatus that consumes wireless data service. Radios 511-512 comprise antennas, amplifiers, filters, modulation, analog-to-digital interfaces, DSP, memory, radio applications, and transceivers that are coupled over bus circuitry. User circuitry 513 comprises memory, CPU, user interfaces and components, and transceivers that are coupled over bus circuitry. The memory in user circuitry 513 stores operating system 515, 5G applications 516, WIFI applications 517, and user application 518. 5G applications 516 and user application 518 are not slice-capable. 5G applications 516 comprises components like PHY, MAC, RLC, PDCP, SDAP, and RRC. WIFI applications 517 comprises components like PHY, MAC, and RLC. The antennas in 5GNR radio 511 are wirelessly coupled to 5GNR access node 421 over 5GNR links. The antennas in WIFI radio 512 are wirelessly coupled to WIFI access node 422 over WIFI links. Transceivers (XCVRs) in radios 511-512 are coupled to transceivers in user circuitry 513. Transceivers in user circuitry 513 are coupled to user components 514. The CPU in user circuitry 513 executes OS 515, 5G applications 516, WIFI applications 517, and user application 518 to exchange network signaling and user data with WIFI access node 422.

UE 406 could be similar to UE 405 but with an LP-WAN radio and applications replacing WIFI radio 512 and WIFI applications 517. UE 401 could be similar to UEs 405-406 when configured with WIFI and LP-WAN radios and applications. UE 401 may use the WIFI or LP-WAN components to access slice 441 over access nodes 422-423. With the WIFI or LP-WAN components, UE 401 may omit the 5GNR components and be slice-capable and WIFI-only or LP-WAN only. Slice-capable UEs 402-403 may have a variety of configurations that use different communication protocols to access slice 441.

Figure 6:
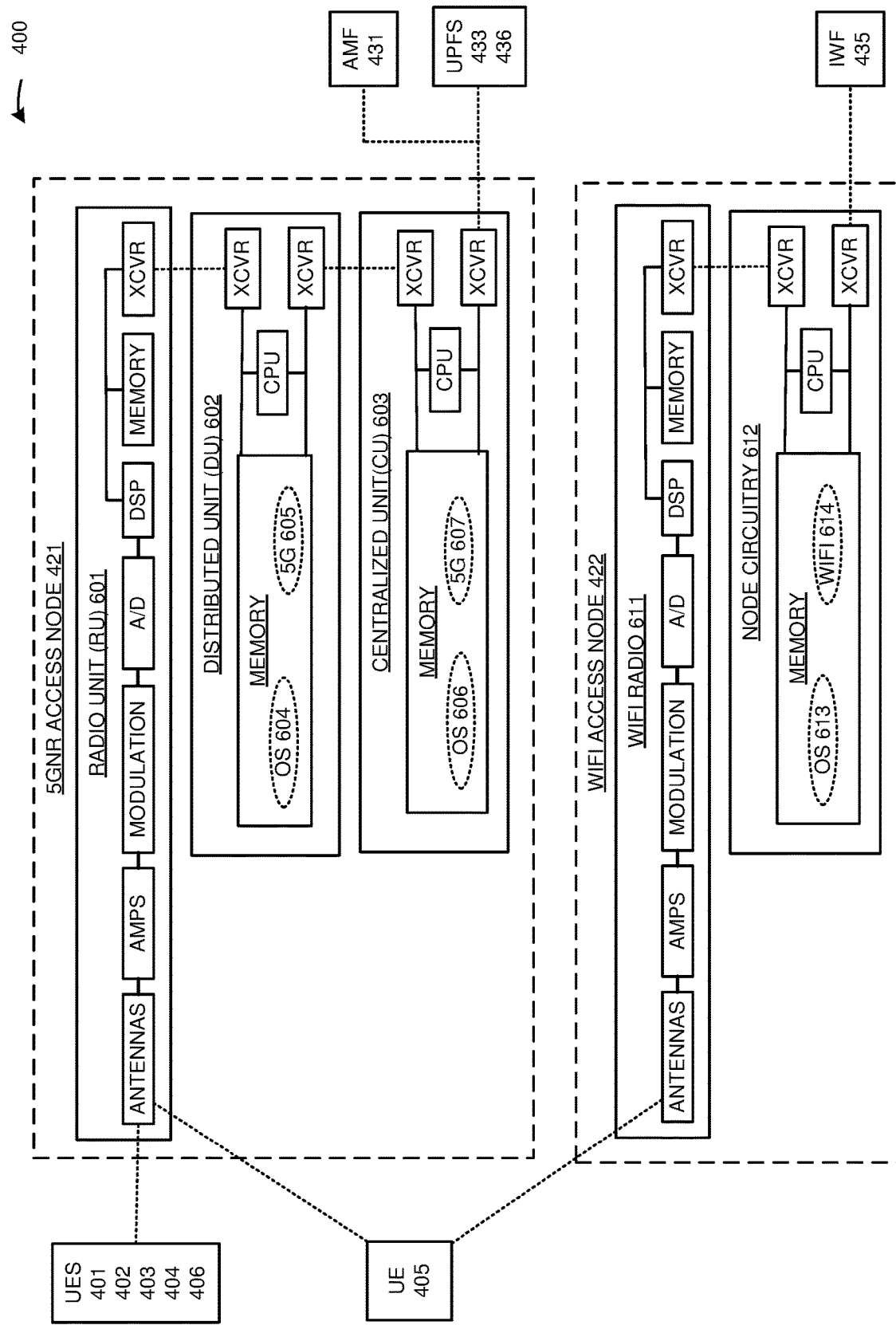
FIG. 6 illustrates access nodes in the 5G wireless communication network.

FIG. 6 illustrates access nodes 421-422 in 5G wireless communication network 400. Access nodes 421-422 comprise an example of wireless access nodes 110 and 120 although nodes 110 and 120 may differ. 5GNR access node 421 comprises Radio Unit (RU) 601, Distributed Unit (DU) 602, and Centralized Unit (CU) 603. RU 601 corresponds to radio 111 and in wireless communication network 100. DU 602 and CU 603 correspond to BBU 112 in wireless communication network 100. RU 601 comprises 5GNR antennas, amplifiers, filters, modulation, analog-to-digital interfaces, DSP, memory, radio applications, and transceivers that are coupled over bus circuitry. DU 602 comprises memory, CPU, user interfaces and components, and transceivers that are coupled over bus circuitry. The memory in DU 602 stores operating system 604 and 5G applications 605 (PHY, MAC, RLC). CU 603 comprises memory, CPU, user interfaces and components, and transceivers that are coupled over bus circuitry. The memory in CU 603 stores operating system 606 and 5G applications 607 (PDCP, SDAP, RRC). The antennas in RU 601 are wirelessly coupled to UEs 401-406 over 5GNR links. Transceivers in RU 601 are coupled to transceivers in DU 602. Transceivers in DU 602 are coupled to transceivers in CU 603. Transceivers in CU 603 are coupled to AMF 431, UPF 433, and UPF 436. The DSP and CPU in RU 601, DU 602, and CU 603 execute the radio applications, operating system 604, 5G applications 605, operating system 606, and 5G applications 607 to exchange network signaling with UEs 401-406 and AMF 431. The DSP and CPU in RU 601, DU 602, and CU 603 execute the radio applications, operating system 604, 5G applications 605, operating system 606, and 5G applications 607 to exchange user data between UEs 401-405 and UPFs 433 and 436.

WIFI access node 422 comprises WIFI radio 611 node circuitry 612. WIFI radio 611 comprises WIFI antennas, amplifiers, filters, modulation, analog-to-digital interfaces, DSP, memory, radio applications, and transceivers that are coupled over bus circuitry. Node circuitry 612 comprises memory, CPU, user interfaces and components, and transceivers that are coupled over bus circuitry. The memory in circuitry 612 stores operating system 613 and WIFI applications 614 (PHY, MAC, RLC). The antennas in WIFI radio 611 are wirelessly coupled to UE 405 over a WIFI link. Transceivers in WIFI radio 611 are coupled to transceivers in node circuitry 612. Transceivers in node circuitry 612 are coupled to non-3GPP IWF 435. The DSP and CPU in WIFI radio 611 and node circuitry 612 execute the radio applications, operating system 613, and WIFI applications 614 to exchange network signaling and user data between UE 405 and IWF 435. LP-WAN access node 423 could be similar to WIFI access node 422 but with an LP-WAN radio and LP-WAN applications replacing WIFI radio 611 and WIFI applications 614.

Figure 7:
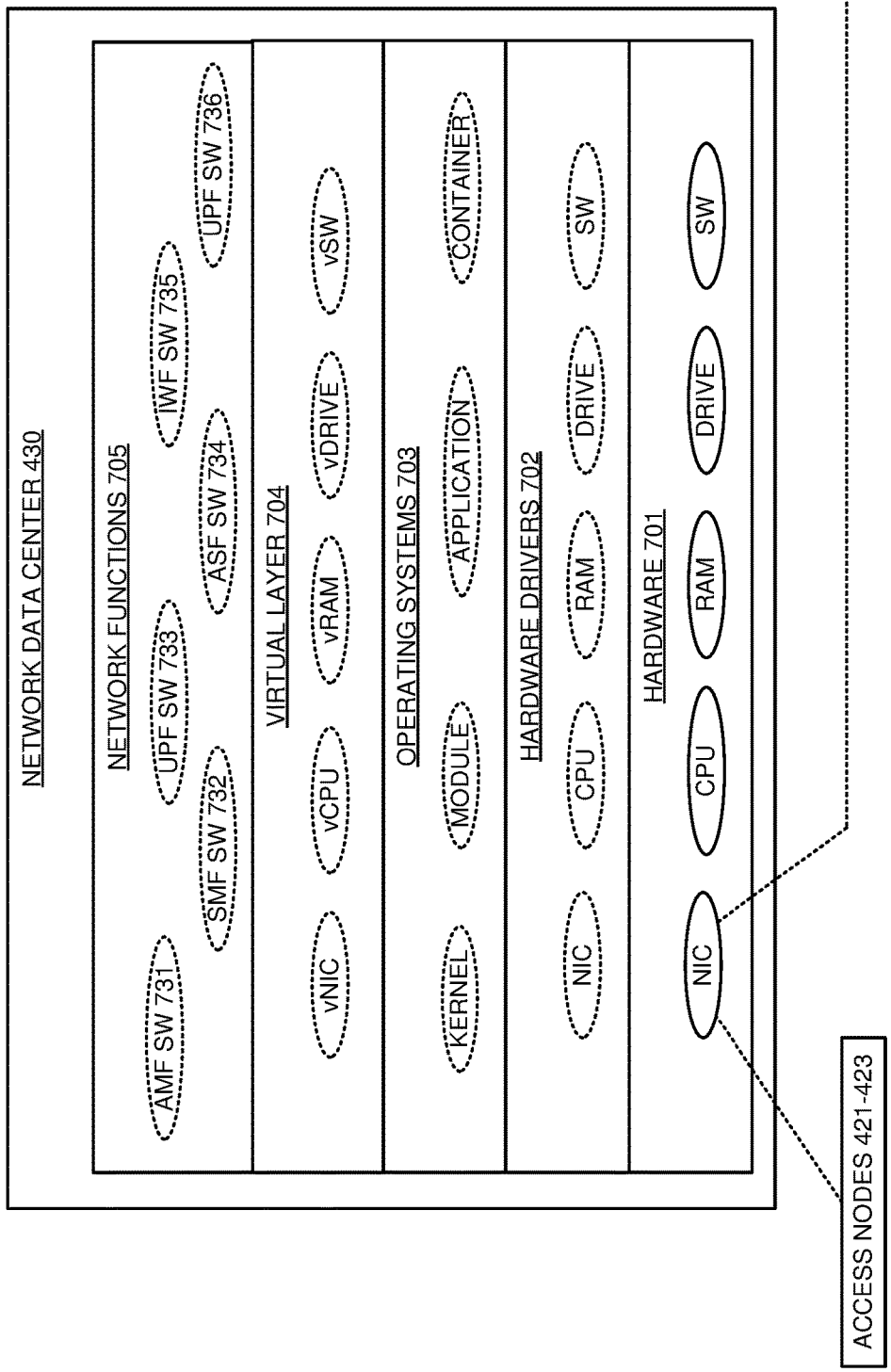
FIG. 7 illustrates a network data center in the 5G wireless communication network.

FIG. 7 illustrates network data center 430 in 5G wireless communication network 400. Network data center 430 comprises an example of wireless network slices 121 and wireless network elements 122, although slices 121 and elements 122 may differ. Network data center 430 comprises hardware 701, hardware drivers 702, operating systems 703, virtual layer 704, and network functions 705. Hardware 701 comprises Network Interface Cards (NIC), Central Processing Units (CPU), Random Access Memory (RAM), Memory Drives (DRIVE), and Data Switches (SW). Hardware drivers 702 comprise software that is resident in the NIC, CPU, RAM, DRIVE, and SW. Operating systems 703 comprise kernels, modules, applications that form containers to execute virtual layer 704 and network functions 705. Virtual layer 704 comprises vNIC, vCPU, vRAM, vDRIVE, and vSW. Network functions 705 comprise AMF software (AMF SW) 731, SMF software 732, UPF software 733, ASF software 734, IWF software 735, and UPF software 736. Other network function software like PCF and NEF software is typically present but omitted for clarity. Network data center 430 may be located at a single site or be distributed across multiple geographic locations. The NIC in hardware 701 are coupled to access nodes 421-423 and to external systems. Hardware 701 executes hardware drivers 702, operating systems 703, virtual layer 704, and network functions 705 to form and operate AMF 431, SMF 432, UPF 433, ASF 434, IWF 435, and UPF 436.

Figure 8:
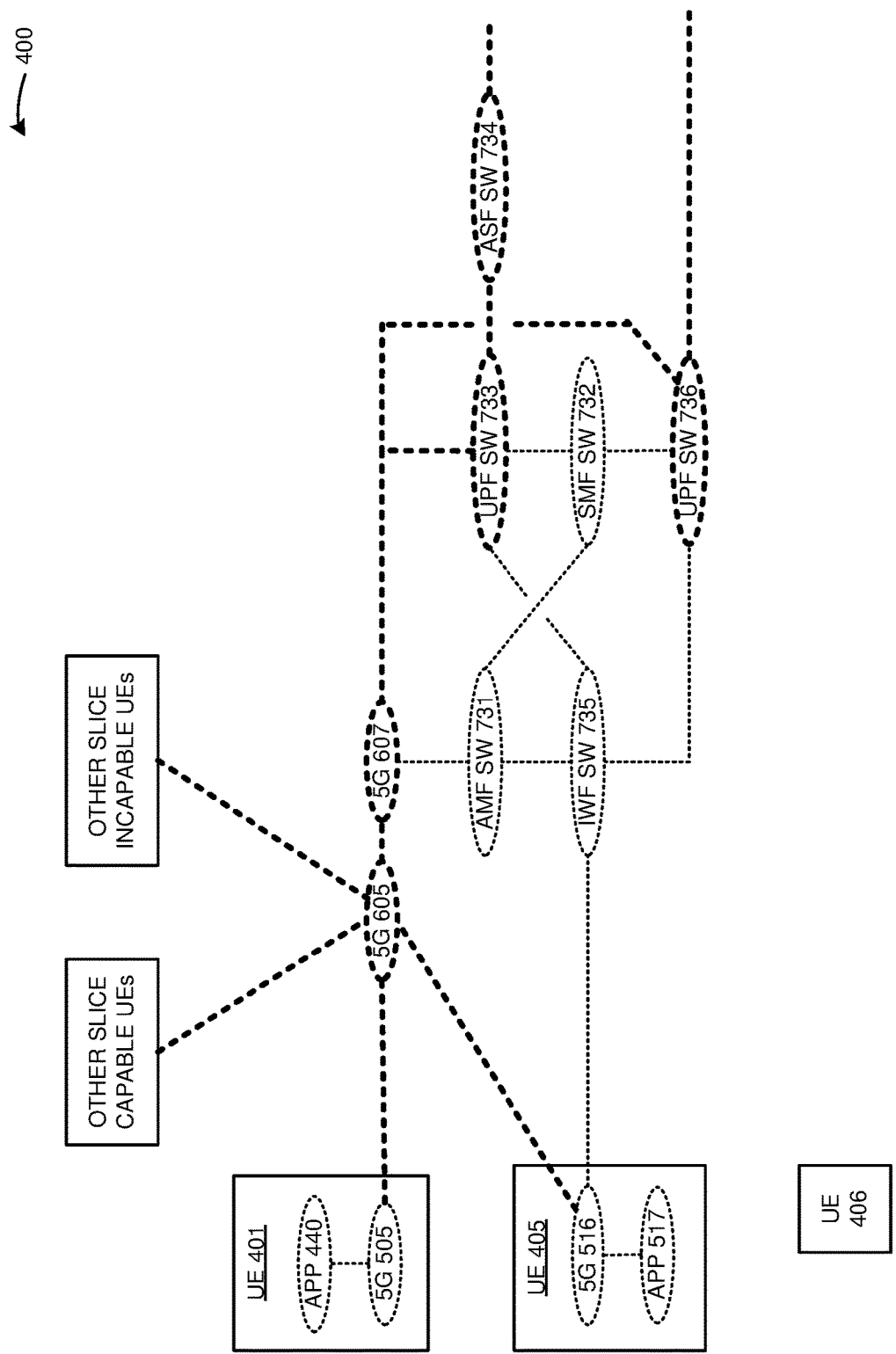
FIG. 8 illustrates an exemplary operation of the 5G wireless communication network to control UE access based on wireless network slice usage.

FIG. 8 illustrates an exemplary operation of 5G wireless communication network 400 to control UE access based on wireless network slice usage. The operation may vary in other examples. 5G application 505 in UE 401 attaches to 5G applications 607 in CU 603 over 5G applications 605 in DU 602. 5G applications 505 in UE 401 report a capability for slice 441 to AMF software 731 over 5G applications 605 and 607. AMF software 731 authenticates UE 401 and authorizes slice 441 for UE 401. AMF software 731 directs SMF software 732 to serve UE 401 over 5G applications 607 and slice 441. SMF software 732 selects UPF software 733 and ASF software 734 for slice 441. AMF software 731 directs 5G applications 607 to connect UE 401 to UPF software 733 for slice 441. SMF software 732 directs UPF software 733 to serve UE 401 over 5G applications 607 and ASF software 734. User application 440 in UE 401 and ASF software 734 exchange slice data over 5G applications 505, 5G applications 605, 5G applications 607, and UPF software 733. Other slice-capable UEs exchange slice data with ASF software 734 over 5G applications 605, 5G applications 607, and UPF software 733. ASF software 734 may exchange some slice data with external systems.

5G application 516 in UE 405 attaches to 5G applications 607 in CU 603 over 5G applications 605 in DU 602. 5G applications 516 in UE 405 do not report a capability for slice 441 to AMF software 731. AMF software 731 authenticates slice-incapable UE 405 and authorizes a service (not slice 441) for UE 405. AMF software 731 directs SMF software 732 to serve UE 405 over 5G applications 607. SMF software 732 selects UPF software 736 to serve UE 405 for the service. AMF software 731 directs 5G applications 607 to connect UE 405 to UPF software 736. SMF software 732 directs UPF software 736 to serve UE 405 over 5G applications 607 in CU 603. User application 517 in UE 405 and external systems exchange non-slice data over 5G applications 516, 5G applications 605, 5G applications 607, and UPF software 736. UPF software 736 may exchanges some non-slice data with external systems. Other slice-incapable UEs exchange slice data with external systems over 5G applications 605, 5G applications 607, and UPF software 736. The operation proceeds to FIG. 9.

Figure 9:
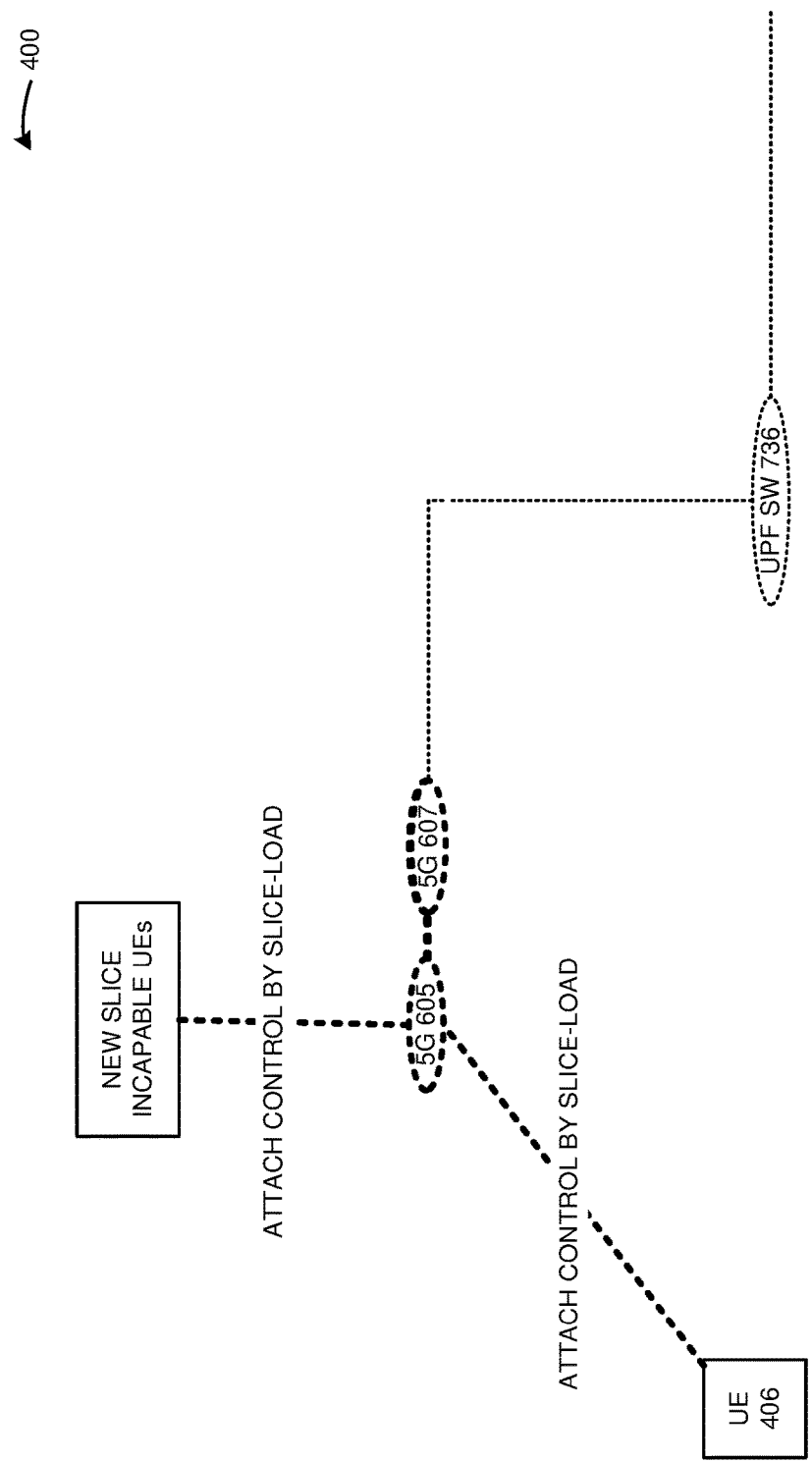
FIG. 9 illustrates an exemplary operation of the 5G wireless communication network to control the UE access based on the wireless network slice usage.

FIG. 9 illustrates an exemplary operation of 5G wireless communication 400 network to control the UE access based on the wireless network slice usage. The operation may vary in other examples. 5G applications 607 in CU 603 determines that its UE load for slice 441 is too high and responsively rejects new attachments from slice-incapable UEs like UE 406. 5G applications 607 starts to accept new attachments from slice-incapable UEs like UE 406 when the UE load for slice 441 is no longer too high. The operation proceeds to FIG. 10.

Figure 10:
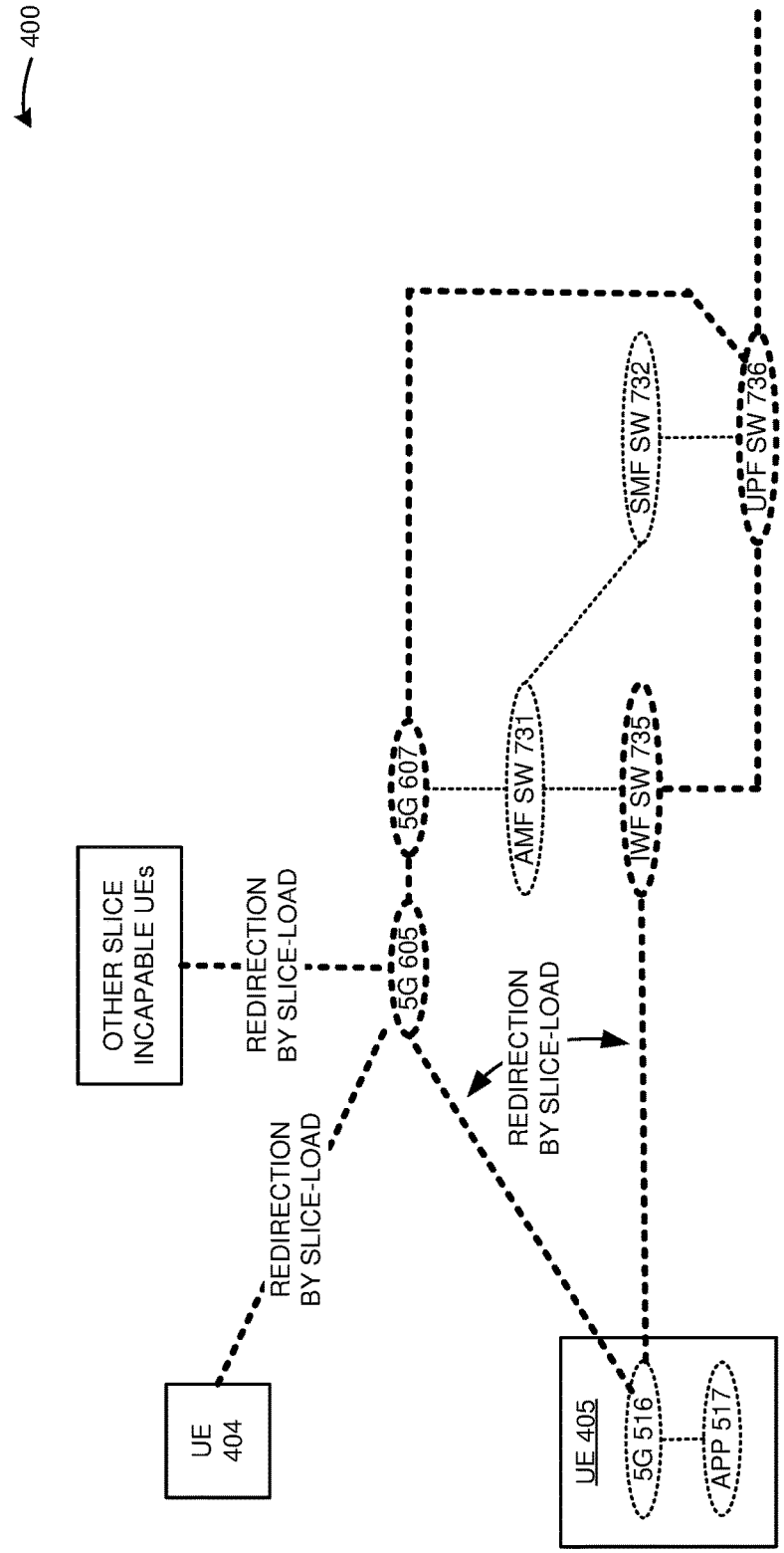
FIG. 10 illustrates an exemplary operation of the 5G wireless communication network to control the UE access based on the wireless network slice usage.

FIG. 10 illustrates an exemplary operation of 5G wireless communication 400 network to control the UE access based on the wireless network slice usage. The operation may vary in other examples. 5G applications 607 in CU 603 determines that its load of slice-capable UEs has reached an even higher threshold and responsively redirects slice-incapable UEs like UEs 404-405 to other access nodes like WIFI access node 422 or LP-WAN access node 423. 5G applications 607 in CU 603 redirect 5G applications 516 in slice-incapable UE 405 to WIFI access node 422. 5G applications 516 in UE 405 then register with AMF software 731 over WIFI access node 422 and IWF software 735. UE 405 is authenticated by AMF software 731 but does not report capability for slice 441. AMF software 731 authorizes a service for UE 405 but does not authorize slice 441 for UE 405. AMF software 731 directs SMF software 432 to serve UE 405. SMF software 732 selects UPF software 736 to serve UE 405. AMF software 731 directs IWF software 735 to connect 5G applications 516 in UE 405 to UPF software 736. SMF software 732 directs UPF software 736 to serve 5G applications 516 in UE 405 over IWF software 735. User application 517 in UE 405 and external systems exchange non-slice data over 5G applications 516, IWF software 735, and UPF software 736. 5G applications 607 in CU 603 stops redirecting slice-incapable UEs away from 5GNR access node 421 when the load of slice-capable UEs falls below the higher threshold. 5G applications 607 may redirect slice-incapable UEs like UE 405 back to 5GNR access node 421.

The wireless data network circuitry described above comprises computer hardware and software that form special-purpose networking circuitry to control UE access based on wireless network slice usage. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control.

Due to this automated execution, the presence of the higher-level software in memory physically changes the structure of the computer hardware machines into special-purpose networking circuitry to control the UE access based on the wireless network slice usage.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless access node to serve slice-capable User Equipment (UEs) and slice-incapable UEs, the method comprising:
   a radio wirelessly exchanging slice data with the slice-capable UEs and exchanging the slice data with a Baseband Unit (BBU);
   the radio wirelessly exchanging non-slice data with the slice-incapable UEs and exchanging the non-slice user data with the BBU;
   the BBU exchanging the slice data and the non-slice data with the radio, exchanging the slice data with at least one wireless network slice, and exchanging the non-slice data with at least one network element; and
   the BBU determining a load for the slice-capable UEs and responsively controlling access to the wireless access node by new slice-incapable UEs based on the load for the slice-capable UEs.

2. The method of claim 1 wherein the BBU controlling the access by the new slice-incapable UEs based on the load for the slice-capable UEs comprises rejecting the access for the new slice-incapable UEs when the load for the slice-capable UEs increases.

3. The method of claim 1 wherein the BBU controlling the access by the new slice-incapable UEs based on the load for the slice-capable UEs comprises accepting the access for the new slice-incapable UEs when the load for the slice-capable UEs decreases.

4. The method of claim 1 wherein the BBU controlling the access by the new slice-incapable UEs based on the load for the slice-capable UEs comprises directing at least some of the slice-incapable UEs to at least one other access node when the load for the slice-capable UEs reaches a threshold.

5. The method of claim 1 wherein the BBU controlling the access by the new slice-incapable UEs based on the load for the slice-capable UEs comprises directing at least some of the slice-incapable UEs to at least one non-Third Generation Partnership Project (non-3GPP) access node when the load for the slice-capable UEs reaches a threshold.

6. The method of claim 1 wherein the BBU controlling the access by the new slice-incapable UEs based on the load for the slice-capable UEs comprises directing at least some of the slice-incapable UEs to at least one Long Term Evolution (LTE) access node when the load for the slice-capable UEs reaches the threshold.

7. The method of claim 1 wherein the BBU controlling the access by the new slice-incapable UEs based on the load for the slice-capable UEs comprises directing at least some of the slice-incapable UEs to at least one Institute of Electrical and Electronic Engineers (IEEE) 803.11 (WIFI) access node when the load for the slice-capable UEs reaches the threshold.

8. The method of claim 1 wherein the BBU controlling the access by the new slice-incapable UEs based on the load for the slice-capable UEs comprises directing at least some of the slice-incapable UEs to at least one Low-Power Wide Area Network (LP-WAN) access node when the load for the slice-capable UEs reaches the threshold.

9. The method of claim 1 wherein the radio wirelessly exchanging the slice data and the non-slice data comprises wirelessly exchanging Fifth Generation New Radio (5GNR) data.

10. The method of claim 1 wherein the radio wirelessly exchanging the slice data and the non-slice data comprises wirelessly exchanging Low-Power Wide Area Network (LP-WAN) data.

11. A wireless access node to serve slice-capable User Equipment (UEs) and slice-incapable UEs, the wireless access node comprising:
a radio configured to wirelessly exchange slice data with the slice-capable UEs and exchange the slice data with a Baseband Unit (BBU);
the radio configured to wirelessly exchange non-slice data with the slice-incapable UEs and exchange the non-slice user data with the BBU;
the BBU configured to exchange the slice data and the non-slice data with the radio, exchange the slice data with at least one wireless network slice, and exchange the non-slice data with at least one network element; and
the BBU configured to determine a load for the slice-capable UEs and responsively control access to the wireless access node by new slice-incapable UEs based on the load for the slice-capable UEs.

12. The wireless access node of claim 11 wherein the BBU is configured to reject the access for the new slice-incapable UEs when the load for the slice-capable UEs increases.

13. The wireless access node of claim 11 wherein the BBU is configured to accept the access for the new slice-incapable UEs when the load for the slice-capable UEs decreases.

14. The wireless access node of claim 11 wherein the BBU is configured to direct at least some of the slice-incapable UEs to at least one other access node when the load for the slice-capable UEs reaches a threshold.

15. The wireless access node of claim 11 wherein the BBU is configured to direct at least some of the slice-incapable UEs to at least one non-Third Generation Partnership Project (non-3GPP) access node when the load for the slice-capable UEs reaches a threshold.

16. The wireless access node of claim 11 wherein the BBU is configured to direct at least some of the slice-incapable UEs to at least one Long Term Evolution (LTE) access node when the load for the slice-capable UEs reaches the threshold.

17. The wireless access node of claim 11 wherein the BBU is configured to direct at least some of the slice-incapable UEs to at least one Institute of Electrical and Electronic Engineers (IEEE) 803.11 (WIFI) access node when the load for the slice-capable UEs reaches the threshold.

18. The wireless access node of claim 11 wherein the BBU is configured to direct at least some of the slice-incapable UEs to at least one Low-Power Wide Area Network (LP-WAN) access node when the load for the slice-capable UEs reaches the threshold.

19. The wireless access node of claim 11 wherein the radio is configured to wirelessly exchange Fifth Generation New Radio (5GNR) data to wirelessly exchange the slice data and the non-slice data.

20. The wireless access node of claim 11 wherein the radio is configured to wirelessly exchange Low-Power Wide Area Network (LP-WAN) data to wirelessly exchange the slice data and the non-slice data.

* * * * *